US008089586B2

(12) United States Patent
Hsieh et al.

(10) Patent No.: US 8,089,586 B2
(45) Date of Patent: Jan. 3, 2012

(54) COLOR FILTER SUBSTRATE

(75) Inventors: Chih-Yung Hsieh, Tainan County (TW);
Chien-Hong Chen, Tainan (TW);
Ying-Ren Chen, Kaohsiung County (TW);
Ju-Hsien Chen, Tainan (TW)

(73) Assignee: Chimei Innolux Corporation, Miaoli County (TW)

( * ) Notice: Subject to any disclaimer, the term of this patent is extended or adjusted under 35 U.S.C. 154(b) by 457 days.

(21) Appl. No.: 12/351,069

(22) Filed: Jan. 9, 2009

(65) Prior Publication Data
US 2009/0180063 A1    Jul. 16, 2009

(30) Foreign Application Priority Data
Jan. 10, 2008   (TW) .............................. 97101047 A

(51) Int. Cl.
*G02F 1/1335* (2006.01)

(52) U.S. Cl. ........................................................ 349/106
(58) Field of Classification Search .................... None
See application file for complete search history.

(56) References Cited

U.S. PATENT DOCUMENTS

| | | | |
|---|---|---|---|
| 2008/0231779 A1* | 9/2008 | Shin et al. ...................... | 349/106 |
| 2008/0239215 A1* | 10/2008 | Chae .............................. | 349/107 |

* cited by examiner

*Primary Examiner* — James Dudek
(74) *Attorney, Agent, or Firm* — Fish & Richardson P.C.

(57) ABSTRACT

A display has color pixels that can be controlled to show color images. Differences in electric fields in different color pixels having color filters with different dielectric constants can be compensated by providing electrodes with different patterns for the different color pixels. For example, the electrodes can have slits in which the widths of the slits can be different for pixels having different colors.

29 Claims, 8 Drawing Sheets

COLOR FILTER SUBSTRATE

CROSS-REFERENCE TO RELATED APPLICATIONS

This application claims priority to Taiwan application Serial No. 097101047, filed Jan. 10, 2008, the contents of which are incorporated by reference.

BACKGROUND

The description relates to color filter substrates.

In some examples, liquid crystal displays (LCD) can have high image quality, compact size, light weight, low driving voltage, and low power consumption, and can be used in, e.g., portable computers, mobile phones, personal digital assistants and color televisions. The LCD applies data voltages to pixels to control the orientation of liquid crystal molecules in the pixels, which in turn control the amount of light (e.g., provided from a backlight module) that passes the liquid crystal layer and is shown by the pixels. The LCD includes a color filter substrate on which a color filter is attached. The color filter filters light to enable the LCD to generate color images.

SUMMARY

In one aspect, in general, a liquid crystal display includes a color filter substrate having an electrode layer having patterns that compensate for differences in dielectric constants of color filter layers. For example, the electrodes can have slits in which the widths of the slits can be different for pixels having different colors. For example, the electrodes can have slits and connecting portions across the slits in which the spacing between the connecting portions is different for pixels having different colors.

In another aspect, in general, a color filter substrate includes a transparent substrate having a first area and a second area; at least one first color filter formed on the first area; at least one second color filter formed on the second area, the second color filter having a dielectric constant that is smaller than the dielectric constant of the first color filter; and an electrode formed on the first area and the second area. The electrode defines at least one first slit in the first area and at least one second slit in the second area, the at least one first slit including a first slit having a width that is larger than the width of any of the second slits.

Implementations can include one or more of the following features. The first color filter includes a green resist material. The second color filter includes a red resist material or a blue resist material. A difference between the dielectric constants of the first color filter and the second color filter is greater than 30% of the dielectric constant of the first color filter. The width of each of the first and second slits is between 6 μm and 12 μm. For example, the at least one first slit includes a slit having a length greater than 80 μm and a slit having a length that is less than 80 μm. The electrode includes finger-like structures formed at a periphery of the first slit and a periphery of the second slit. A ratio between the width of the first slit to the width of the second slit is substantially equal to a ratio between the dielectric constant of the first color filter to the dielectric constant of the second color filter. A liquid crystal layer is disposed between the color filter substrate and an active component array substrate. A backlight module provides light to illuminate a liquid crystal display panel that includes the color filter substrate.

In another aspect, in general, a display includes a first pixel having a first color filter and a first electrode, the first color filter having a first dielectric constant, the first electrode defining a first pattern having one or more openings; and a second pixel having a second color filter and a second electrode, the second color filter having a second dielectric constant that is different from the first dielectric constant, the second electrode defining a second pattern having one or more openings. The first pattern and the second pattern are different and configured to compensate for a difference in electric fields in the first and second pixels caused by a difference in the dielectric constants of the first and second color filters.

Implementations can include one or more of the following features. The first pattern includes a short slit and a long slit, the second pattern also includes a short slit and a long slit, in which the long slit of the first pattern is wider than the long slit of the second pattern. The first electrode is electrically coupled to the second electrode. The first color filter includes a red color filter, a green color filter, or a blue color filter.

In another aspect, in general, a display includes a first set of pixels and a second set of pixels. Each of the first set of pixels has a first color filter and a first electrode, the first color filters being of a same color and each having a first dielectric constant. The first electrodes have a same first pattern and each has one or more openings. Each of the second set of pixels has a second color filter and a second electrode, the second color filters being of a same color and each having a second dielectric constant that is different from the first dielectric constant. The second electrodes of the second set of pixels have a same second pattern and each has one or more openings, in which the second pattern is different from the first pattern.

In another aspect, in general, a color filter substrate includes a transparent substrate defining a first area and a second area; at least one first color filter formed in the first area; at least one second color filter formed in the second area, the second color filter having a dielectric constant that is smaller than the dielectric constant of the first color filter; and an electrode formed in the first area and the second area. The electrode defines at least one first slit in the first area, the electrode including a plurality of first connecting portions that connect portions of the electrode layer at two sides of the first slit to form a plurality of first sub-slits. The electrode layer also defines at least one second slit in the second area, the electrode layer including a plurality of second connecting portions that connect portions of the electrode layer at two sides of the second slit to form a plurality of second sub-slits. The first sub-slits have an average length that is greater than the average length of the second sub-slits.

Implementations can include one or more of the following features. The first color filter includes a green resist material. The second color filter includes a red resist material or a blue resist material. The electrode includes a plurality of finger-like structures formed at a periphery of the first slit and a periphery of the second slit. In some examples, each of the first sub-slits and the second sub-slits has a length that is greater than 20 μm. Each of the first connecting portions and the second connecting portions has a width that is less than or equal to 6 μm. The number of the first connecting portions associated with each of the first slits is greater than the number of the second connecting portions associated with each of the second slits. A liquid crystal layer is disposed between the color filter substrate and an active component array substrate. A backlight module provides light that illuminates a liquid crystal display panel that includes the color filter substrate.

In another aspect, in general, pixels of a display are controlled to show an image; and differences in electric fields in different pixels having color filters with different dielectric constants are compensated by providing electrodes with different patterns for the different pixels.

Implementations can include one or more of the following features. Providing electrodes with different patterns includes providing (a) different pixel electrodes having different patterns or (b) different common electrodes having different patterns. Providing electrodes with different patterns includes providing a first electrode in a first pixel having a first color filter and a second electrode in a second pixel having a second color filter, the first electrode defining a first slit, the second electrode defining a second slit, the first slit having a width that is larger than the width of the second slit. The first color filter includes a green filter and the second color filter includes a red filter. Providing electrodes with different patterns includes providing a first electrode in a first pixel having a first color filter and a second electrode in a second pixel having a second color filter, the first electrode layer defining a first slit, the second electrode defining a second slit, the first electrode including first connecting portions that connect portions of the first electrode at two sides of the first slit to define a plurality of first sub-slits, and second electrode including second connecting portions that connect portions of the second electrode at two sides of the second slit to define a plurality of second sub-slits, the first sub-slits having an average length that is different from the average length of the second sub-slits.

In another aspect, in general, a color filter substrate includes a transparent substrate, a light-shade layer, at least one first color filter layer, at least one second color filter layer, and an electrode layer. The transparent substrate has a first area and a second area. The first color filter layer is formed in the first area. The second color filter layer is formed in the second area. The dielectric constant of the first color filter is greater than the dielectric constant of the second color filter. The electrode layer is formed in the first area and the second area. The electrode layer includes a plurality of first slits and a plurality of second slits. The first slits are formed in the first area. The first slits include at least one long slit and at least one short slit, the long slit is parallel to the short slit, the length of the short slit is shorter than the length of the long slit, and the width of the long slit is greater than the width of the short slit. The second slits are formed in the second area. The width of each of the second slits is less than the width of the long slit in the first area.

In another aspect, in general, a color filter substrate includes a transparent substrate, a light-shade layer, at least one first color filter layer, at least one second color filter layer, and an electrode layer. The transparent substrate has a first area and a second area. The first color filter layer is formed in the first area. The second color filter layer is formed in the second area. The dielectric constant of the first color filter is greater than the dielectric constant of the second color filter. The electrode layer is formed in the first area and the second area. The electrode layer includes a plurality of first slits and a plurality of second slits. The first slits are formed in the first area. Each of the first slits is associated with a plurality of first connecting portions that cause a plurality of first sub-slits to be formed between the first connecting portions, and the length of the first sub-slits are the same. The second slits are formed in the second area. Each of the second slits is associated with a plurality of second connecting portions that cause a plurality of second sub-slits to be formed between the second connecting portions, and the length of the second sub-slits are the same. The length of each of the first sub-slits is greater than the length of each of the second sub-slits.

In another aspect, in general, the color filter substrates described above can be used in liquid crystal display panels.

Other aspects can include other combinations of the features recited above and other features, expressed as methods, apparatus, systems, program products, and in other ways.

Advantages may include one or more of the following. The gray scale levels of pixels having different colors can be controlled more precisely. The quality of a display can be improved.

DETAILED DESCRIPTION

Figure 1:
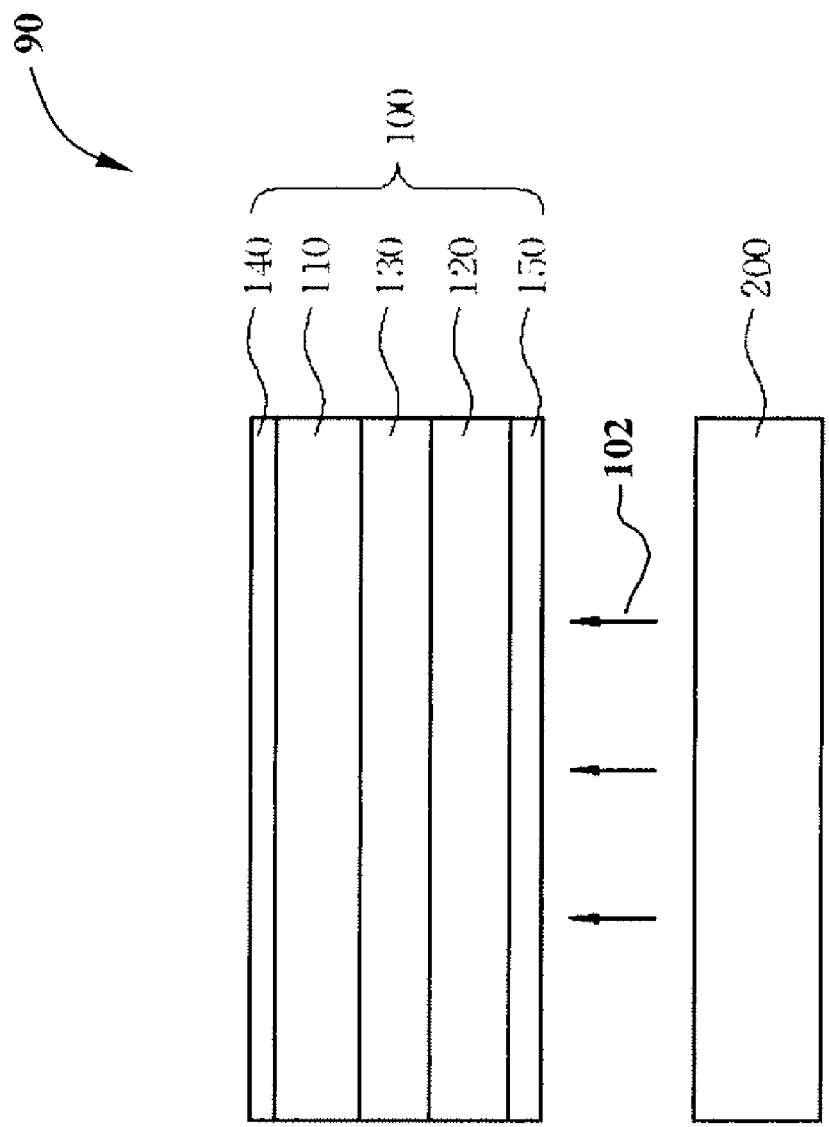
FIG. 1 is a cross-sectional view of an example liquid crystal display.

Referring to FIG. 1, an example liquid crystal display 90 includes a liquid crystal display panel 100 that receives light 102 from a backlight module 200. In some implementations, the liquid crystal display panel 100 has pixels each having multi-domain electric fields to control the orientations of liquid crystal molecules. When a pixel voltage is applied to a pixel, multiple domains of the liquid crystal molecules can be formed in each pixel. This increases the viewing angle of the LCD 90. The multi-domain electric fields are formed by electrodes having particular patterns. A feature of the LCD 90 is that electrodes of different color pixels can have different patterns to compensate for differences in color filters having different dielectric constants.

The backlight module 200 can be, e.g., an edge-lighting module that illuminates the LCD panel 100 from the left, right, top, and/or bottom sides, or a bottom-lighting module that illuminates the LCD panel 100 from the back side (i.e., the side that is opposite to the side facing a viewer of the display 90). The backlight module 200 can include one or more optical films to improve optical characteristics of the display 90. The optical films can include, e.g., a diffuser, a prism sheet, a brightness enhancement film, a dual brightness enhancement film, a diffused reflective polarizer film, or a combination of two or more of the above films. The backlight module 200 includes a light source that can be, e.g., a cold cathode fluorescent lamp (CCFL), a hot cathode fluorescent lamp (HCFL), a light-emitting diode (LED), an organic light emitting diode (OLED), or an electro-luminescence (EL) lamp.

In some implementations, the liquid crystal display panel 100 includes a color filter substrate 110, an active component array substrate 120, a liquid crystal layer 130, a first polarizer 140, and a second polarizer 150. The active component array substrate 120 can include, e.g., a thin film transistor (TFT) array. The liquid crystal layer 130 is disposed between the color filter substrate 110 and the active component array substrate 120. The first polarizer 140 is disposed on one side of the color filter substrate 110 and opposite to the active component array substrate 120. The second polarizer 150 is disposed on one side of the active component array substrate 120 and opposite to the color filter substrate 110. In this example, the light 102 provided by the backlight module 200 passes the liquid crystal display panel 100 from the second polarizer 150 to the first polarizer 140.

Figure 2:
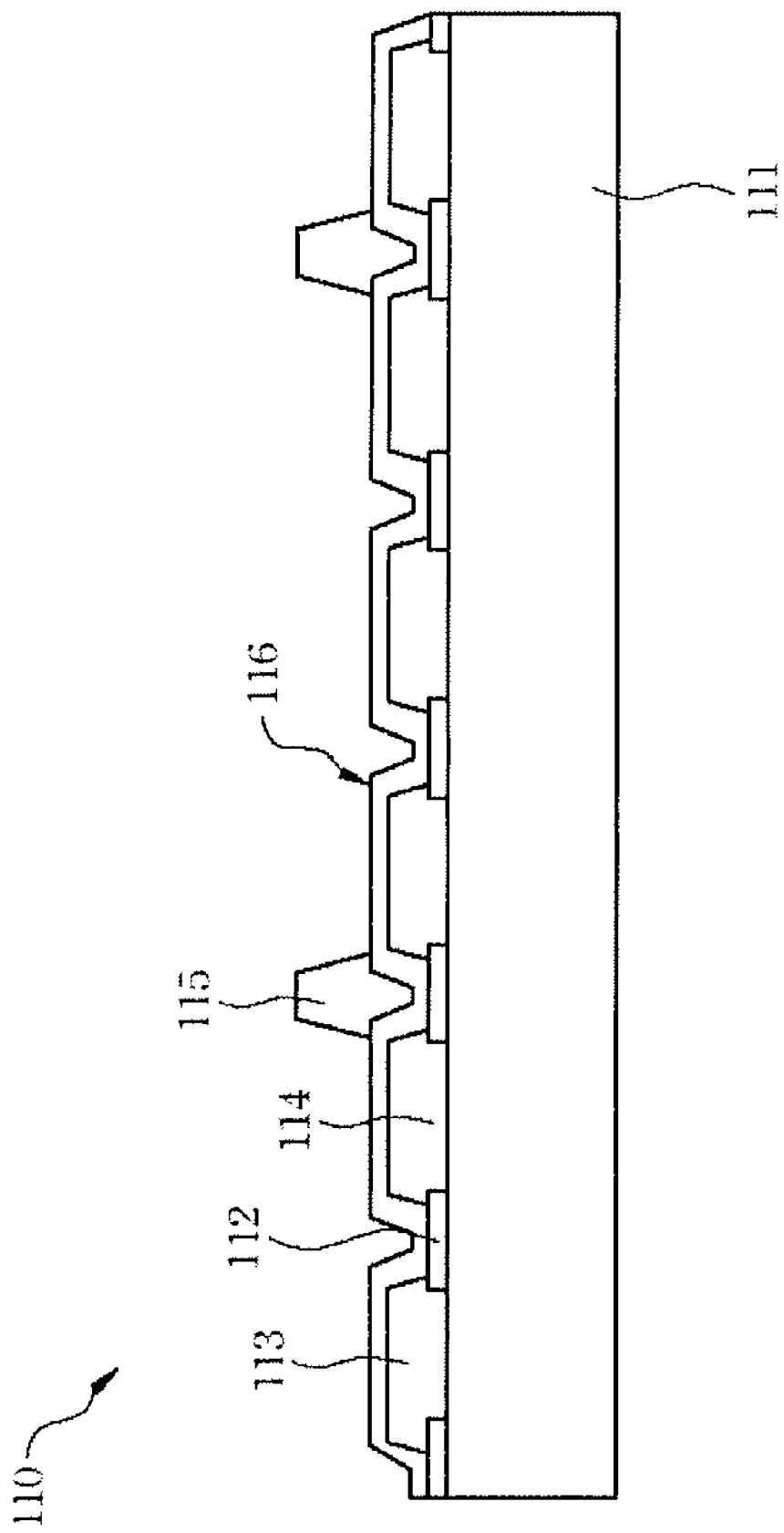
FIG. 2 is a cross-sectional view of an example color filter substrate.
Figure 3:
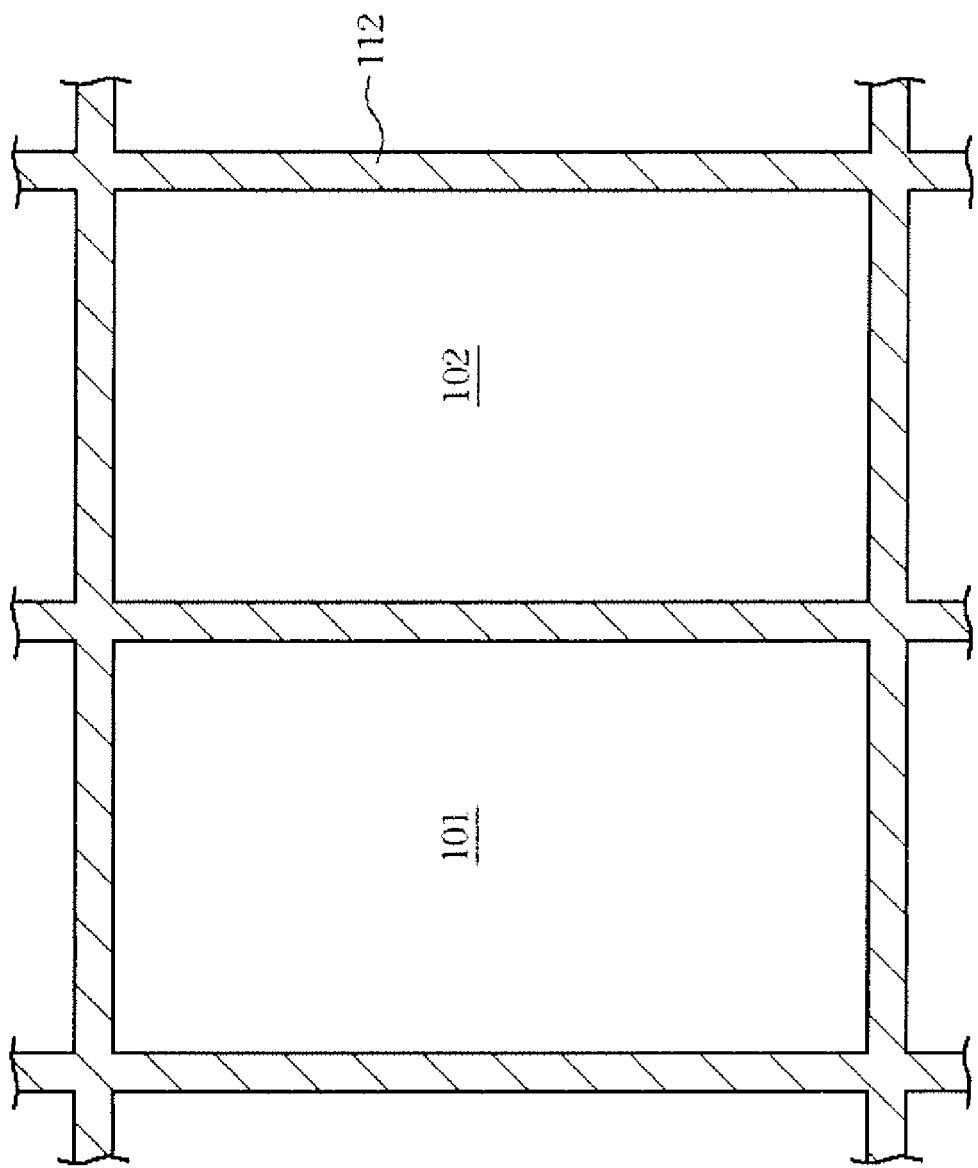
FIG. 3 is a partial top view of an example black matrix structure of the color filter substrate.

FIG. 2 is a cross-sectional view of an example color filter substrate 110 and FIG. 3 is a partial top view of an example black matrix structure of the color filter substrate 110. The color filter substrate 110 includes a transparent substrate 111, a light-shade layer 112, at least one first color filter layer 113, at least one second color filter layer 114, a plurality of spacers 115, and an electrode layer 116. The transparent substrate 111 can be, e.g., a glass substrate or a flexible transparent substrate.

The transparent substrate 111 has at least one first area 101 and at least one second area 102. The light-shade layer 112 is formed on the transparent substrate 111 and functions as a black matrix structure that separates the first color filter layer 113 and the second color filter layer 114. The light-shade layer 112 prevents light from leaking from regions between the first area 101 and the second area 102. This increases the color contrast of the liquid crystal display panel 100. The first area 101 and the second area 102 can be defined by the black matrix structure. The light-shade layer 112 can be made of, for example, metal (such as chromium), graphite, or a resin material.

The first color filter layer 113 is formed in the first area 101, and the second color filter layer 114 is formed in the second area 102. The first color filter layer 113 and the second color filter layer 114 are made of different color resist materials that have different dielectric constants.

In the description below, it is assumed that the dielectric constant of the first color filter layer 113 is greater than the dielectric constant of the second color filter layer 114. In some examples, the difference between the dielectric constants of the first and second color filter layers can be greater than 30% of the dielectric constant of the first color filter layer 113. For example, the first color filter layer 113 can be made of a green resist material having a dielectric constant equal to about 6. The second color filter layer 114 can be made of a red or blue resist material having a dielectric constant equal to about 4. In this example, the difference (i.e., 6−4=2) between the dielectric constants of the first and second color filter layers is greater than 30% of the dielectric constant (i.e., 6) of the first color filter layer 113.

The first area 101 is associated with a first color pixel, and the second area 102 is associated with a second color pixel. In some implementations, the LCD panel 100 includes red, green, and blue pixels that have red, green, and blue filters, respectively.

The spacers 115 are disposed on the electrode layer 116 to define the cell gap between the color filter substrate 110 and the active component array substrate 120. The spacers 115 can be made of, e.g., silica, polymer or resist material, and can have, e.g., a spherical shape or a column shape.

Figure 4:
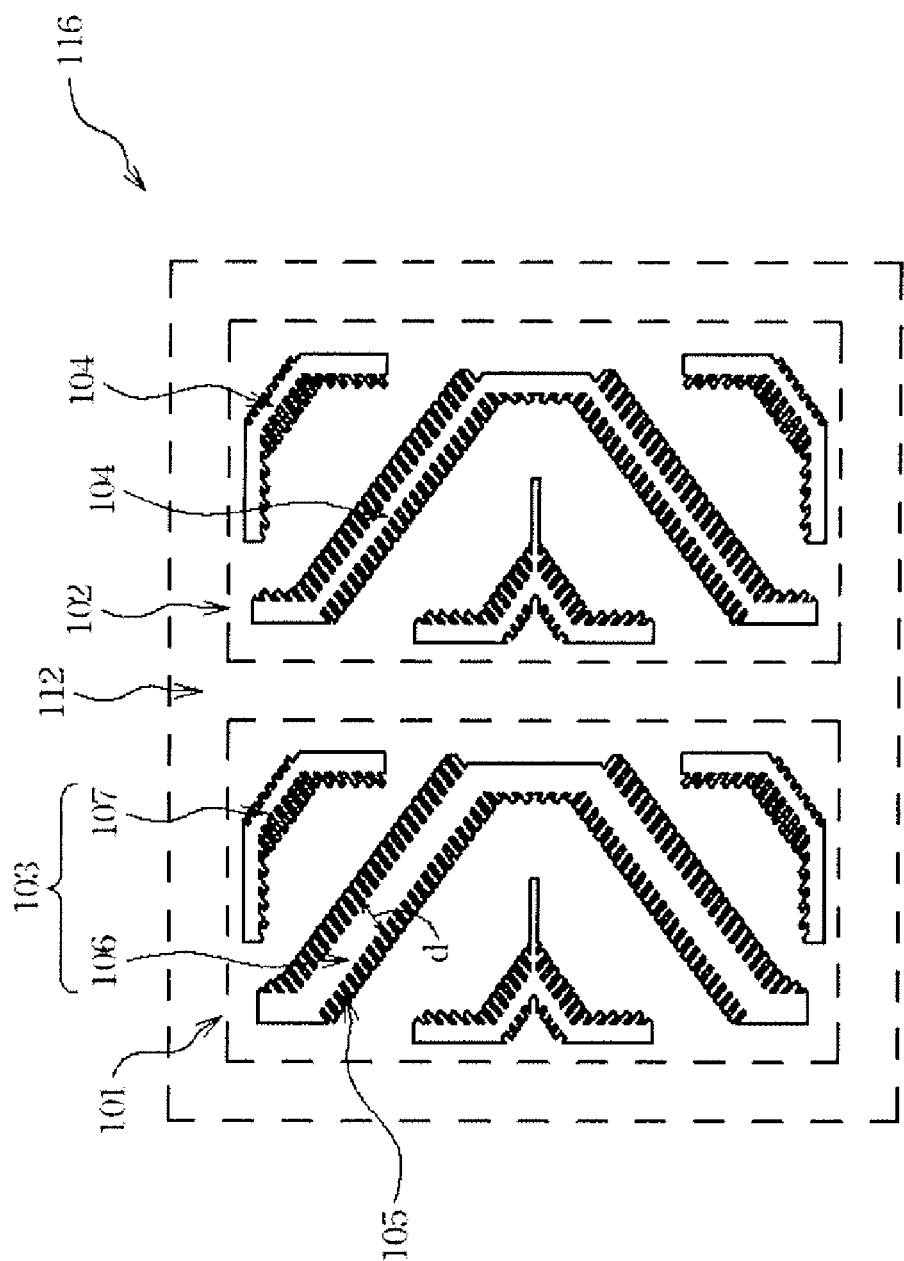
FIG. 4 is a top view of an example electrode layer of a color filter substrate.

FIG. 4 is a top view of an example electrode layer 116 of the color filter substrate 110. The electrode layer 116 is formed on the light-shade layer 112, the first color filter layer 113, and the second color filter layer 114. The portion of the electrode layer 116 above the first color filter layer 113 is in the first area 101, and the portion of the electrode layer 116 above the second color filter layer 114 is in the second area 102. In some implementations, the electrode layer 116 is a common electrode, in which the electrode layer 116 of two or more pixels of the display 90 are electrically connected together. Voltages applied between the common electrode 116 and pixel electrodes on the active component array substrate 120 cause electric fields to be formed across the liquid crystal layer 130 to control the orientations of the liquid crystal molecules in the liquid crystal layer 130.

In this document, the terms "above" and "below" are used to describe the relative positions of various components of the display 90 as shown in the figures. It is understood that the display 90 can be used in various orientations, and a first component that we describe as being above a second component in the figure can actually be below the second component when the display is in certain orientations.

The electrode layer 116 can be made of an electrically conductive and transparent material, such as indium tin oxide (ITO), indium zinc oxide (IZO), aluminum-doped zinc oxide (AZO), gallium-doped zinc oxide (GZO), transparent conductive oxide (TCO), or zinc oxide (ZnO).

In some implementations, the electrode layer 116 includes several first slits 103 in the first area 101 and several second slits 104 in the second area 102. The first slits 103 and the second slits 104 cause the electric fields in the liquid crystal layer 130 to form multiple domains. The electric fields control the orientations of liquid crystal molecules and cause multiple domains to be formed in the liquid crystal layer 130.

In some implementations, the width of each of the first slits 103 and the second slits 104 is between about 6 μm to 12 μm. The dimensions provided here are designed or intended values, but the actual dimensions of the slits in a manufactured product may vary from the designed values due to manufacturing tolerances. The first slits 103 include at least one long slit 106 and at least one short slit 107. The long slit 106 is parallel to the short slit 107, the short slit 107 being shorter than the long slit 106. In some examples, the long slit 106 has a length greater than about 80 μm, and the short slit 107 has a length less than about 80 μm. The width of each of the second slits 104 in the second area 102 is less than the width of the long slit 106 in the first area 101. In some examples, the long slit 106 (or 104) has a V shape to change the distribution of the electric fields in the pixel.

The electrode layer 116 includes finger-like structures 105 that are formed at the periphery of the first slits 103 and the periphery of the second slits 104. Here, the width d of each of the first slits 103 and the second slits 104 are defined as the distance between two opposing finger-like structures 105. It is also possible to use an electrode layer 116 that does not include the finger-like structures 105.

Figure 5A:
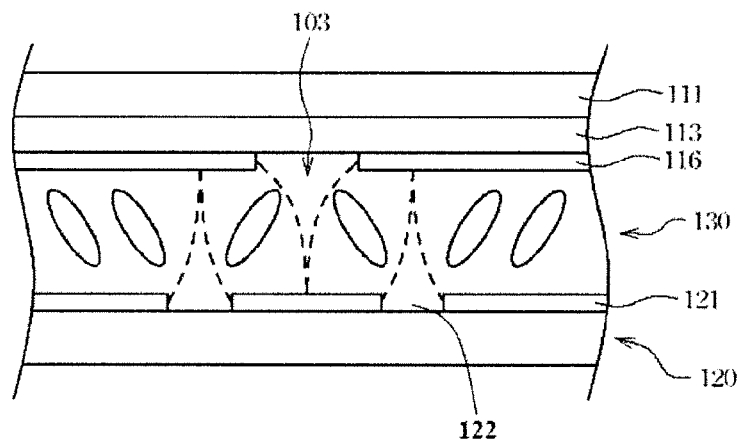
FIGS. 5A and 5B are partial cross-sectional views showing the first slits and the second slits having the same width in a liquid crystal display panel.
Figure 5B:
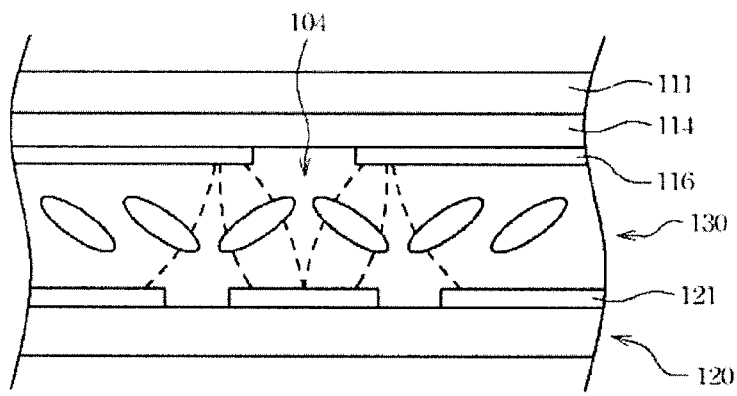
Figure 6A:
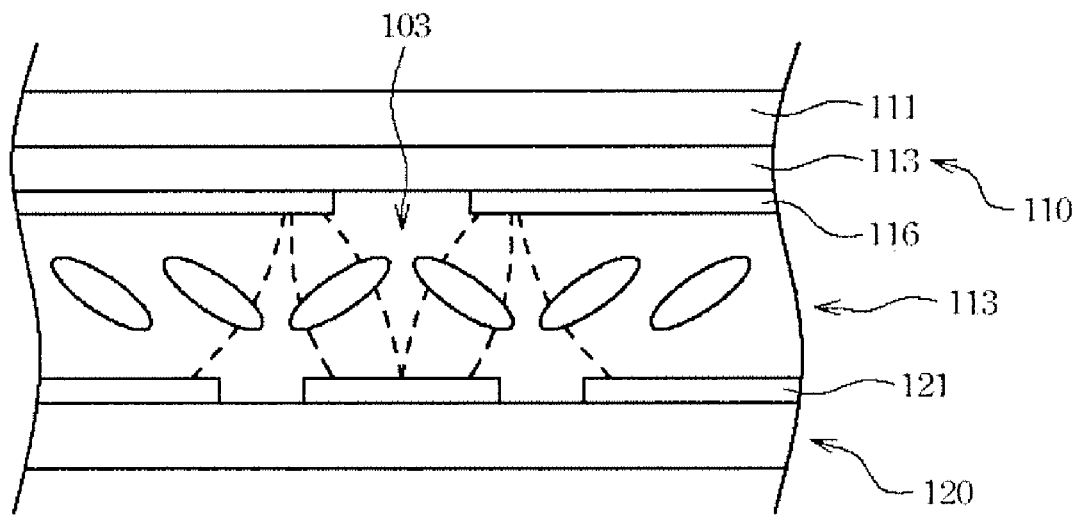
FIGS. 6A and 6B are partial cross-sectional views showing the first slits and the second slits with different widths in a liquid crystal display panel.
Figure 6B:
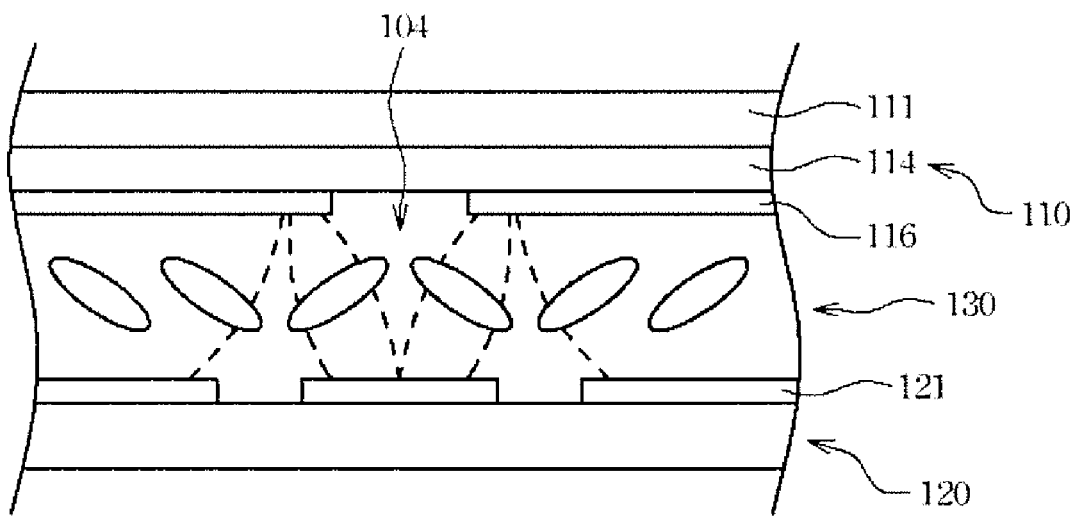

For purpose of comparison, FIGS. 5A and 5B are partial cross-sectional views of an example liquid crystal display panel 100 in which the first slits 103 and the second slits 104 have the same width. FIGS. 6A and 6B are partial cross-sectional views of an example liquid crystal display panel 100 in which the first slits 103 and the second slits 104 have different widths. In some implementations, the LCD panel 100 includes pixel electrodes 121 that have openings 122. The slits 103 and 104 in the common electrode 116 and the openings 122 in the pixel electrode 121 cause the electric fields in the liquid crystal layer 130 to have multiple domains, in which the electric fields tilt in different directions at the boundaries of the domains. The multi-domain electric fields cause multiple domains to be formed in the liquid crystal layer 130 in each of the first area 101 and the second area 102.

In some implementations, the liquid crystal layer 130 is a vertical alignment mode multi-domain liquid crystal layer.

When no voltage is applied across the liquid crystal layer 130, the liquid crystal molecules are substantially aligned along a Z-axis direction, which is perpendicular to the surfaces of the substrates 111 and 120. When an electric field parallel to the Z-axis is applied to the liquid crystal layer 130, the liquid crystal molecules rotate to form an angle with respect to the Z-axis. The greater the electric field along the Z-axis, the greater the tilt angle of the liquid crystal molecules with respect to the Z-axis.

When the same voltage is applied between the electrode layer 116 and the pixel electrode in the first area 101, and between the electrode layer 116 and the pixel electrode in the second area 102, multi-domain electric fields are formed in the first area 101 and the second area 102, causing multiple domains to be formed in the liquid crystal layer 130 in the first area 101 and the second area 102.

Figure 5C:
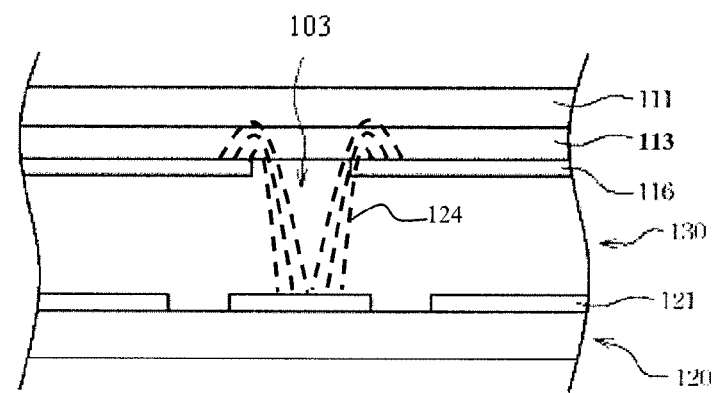
FIG. 5C is a diagram showing an example distribution of electric field lines in the vicinity of a slit.

In the examples of FIGS. 5A and 5B, the dielectric constant of the first color filter layer 113 is greater than the dielectric constant of the second color filter layer 114. This causes the distributions of the electric field in the first area 101 (having the first color filter layer 113) and the second area 102 (having the second color filter layer 114) to be different. As shown in FIG. 5C, some electric field lines 124 extend from the pixel electrode 121 to the upper side of the electrode 116, passing through the slit 103 and the color filter layer 113. Therefore, the dielectric constant of the color filter layer 113 affects the distribution of the electric field near the slit 103.

In this example, the Z-axis components of the electric field formed at the first slit 103 in the first area 101 are greater than the Z-axis components of the electric field formed at the second slit 104 in the second area 102, and causes the liquid crystal molecules at the first slit 103 to have greater tilt angles relative to the Z-axis as compared to the tilt angles of the liquid crystal molecules at the second slit 104.

In the example of FIGS. 6A and 6B, the width of the long slit 106 (in the area 101) is larger than the width of each of the second slits 104 (in the area 102). The wider long slit 106 causes the electric field formed at the long slits 106 to have a smaller Z-axis component compared to the electric field at the second slits 104. The smaller Z-axis electric field component formed at the long slit 106 causes the liquid crystal molecules to tilt at smaller angles relative to the Z-axis, as compared to the example in FIG. 5A. This causes the orientations of liquid crystal molecules in the first area 101 and the second area 102 to be similar, thereby enhancing the display quality of the LCD 90.

In some implementations, the ratio of the width of the long slit 106 to the width of each of the second slits 104 is substantially equal to the ratio of the dielectric constant of the first color filter layer 113 to the dielectric constant of the second color filter layer 114. For example, if the dielectric constant of the first color filter layer 113 is 5, and the dielectric constant of the second color filter layer 114 is 4, and the width of each of the second slits 104 is 9 μm, then the width of the long slit 106 can be between about 11 μm to 12 μm.

The widths of the first slits 103 and the second slits 104 can be selected to compensate for the effects of the different dielectric constants of the color filter layers 113 and 114 on the electric field distribution. For example, the widths of the first slits 103 and the second slits 104 can be selected such that when the same data voltage is applied to the pixels associated with the first area 101 and the second area 102, the liquid crystal molecules in the first area 101 and the second area 102 are rotated to have similar orientations, thereby enhancing the display quality of the LCD.

Figure 7:
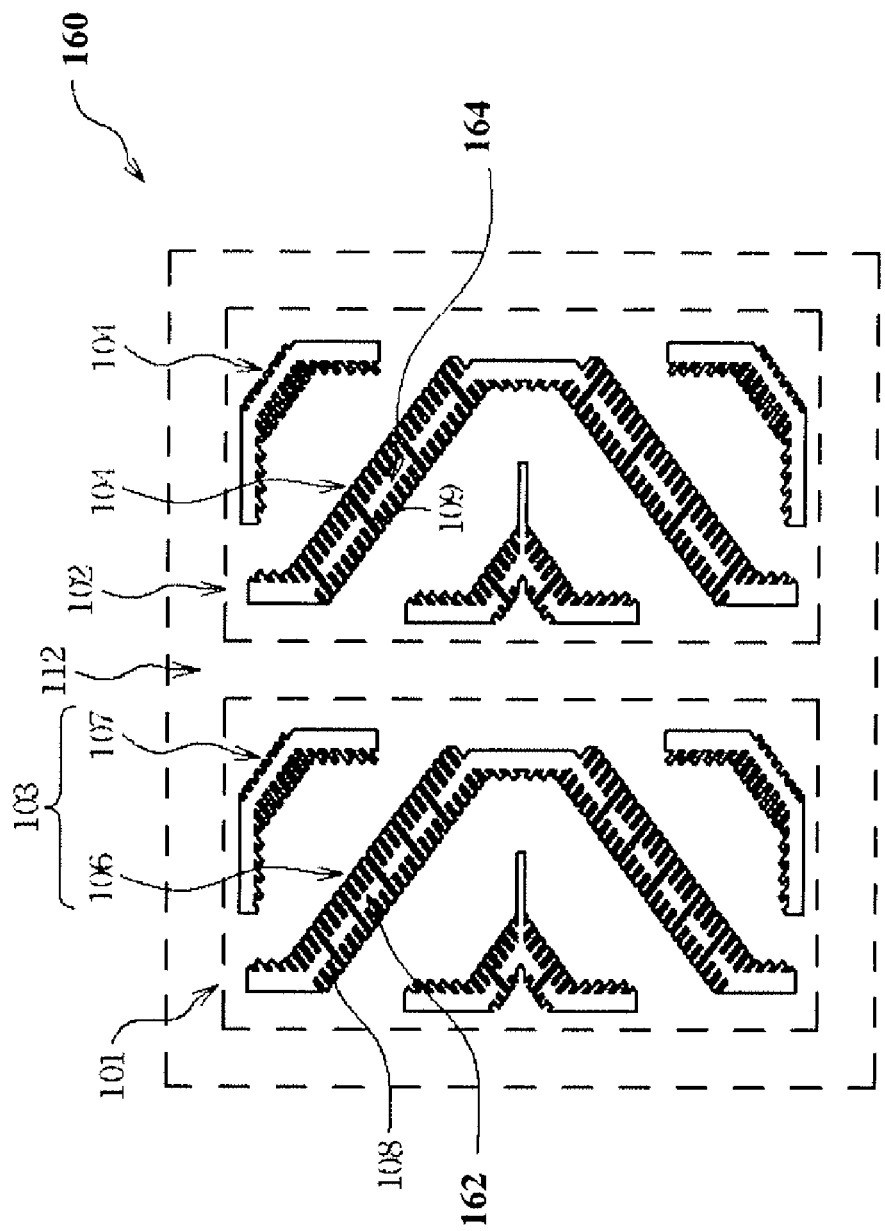
FIG. 7 is a top view of an example electrode layer.

FIG. 7 is a top view showing an example electrode layer 160. Some reference numerals used in the example of FIG. 4 are also used in the example of FIG. 7. The construction of the example in FIG. 7 is similar to that of the example in FIG. 4, except that instead of having different slit widths (as in the example of FIG. 4), the example of FIG. 7 uses connecting portions having different spacing to define sub-slots having different lengths.

In the example of FIG. 7, the electrode layer 160 includes a plurality of first connecting portions 108 each connecting portions of the electrode layer 160 on two sides of each of the first slits 103. The connecting portions 108 divide the first slit 103 into several first sub-slits 162. In some examples, the length of the first sub-slits 162 are the same, in which the length of a first sub-slit 162 is defined as the interval between two first connecting portions 108. The electrode layer 160 includes several second connecting portions 109 each connecting portions of the electrode layer 160 on two sides of each of the second slits 104. The connecting portions 109 divide the second slit 104 into several second sub-slits 162. In some examples, the length of the second sub-slits 162 are the same, in which the length of a second sub-slit 162 is defined as the interval between two second connecting portions 109.

In some examples, the width of the first connecting portions 108 and the second connecting portions 109 are the same, and the number of the first connecting portions 108 formed in each of the first slits 103 is greater than the number of the second connecting portions 109 formed in each of the corresponding second slits 104. Thus, the average length of the first sub-slits 162 is less than the average length of the second sub-slits 164.

In some implementations, the length of each of the first sub-slits 162 and the second sub-slits 164 is greater than 20 μm, and the width of each of the first connecting portions 108 and the second connecting portions 109 (measured along a lengthwise direction of the slit 103 or 104) is less than or equal to 6 μm, which is sufficiently small such the first connecting portions 108 and the second connecting portions 109 do not affect the electric field formed in the liquid crystal display panel 100.

When multi-domain electric fields are formed in a liquid crystal layer, there may be "singular points" such that the liquid crystal molecules at different sides relative to a singular point tend to align in different directions, causing different domains to be formed at different sides of the singular point. When there are slits (e.g., 103 or 104) in the electrode layer 116, singular points tend to form at or near the slits.

Simulations of the orientations of the liquid crystal molecules show that when the dielectric constant of the color filter layer (e.g., 113) is larger, the singular points and the liquid crystal domains tend to be formed more randomly, increasing image retention (e.g., a residual image remains for a short period of time) and reducing image quality. The connecting portions 108 or 109 described above can help "anchor" the singular points so that the singular points occur less randomly. The connecting portions 108 divide the first slit 103 into several sub-slits 162, thereby limiting the formation of singular points and the liquid crystal domains, alleviating the image retention problem.

If the dielectric constant of the color filter layer (such as the second color filter layer 114) on the color filter substrate 110 is smaller, it is less likely that singular points and different liquid crystal domains will be formed at the slits (such as the second slits 104). Thus, each slit 104 can have a smaller number of the second connecting portions 109 to increase the transmission rate of the electrode layer 116a.

The width of the slits or the distance between the connection portions of the electrode layer 116 can be selected according to different dielectric constants of the color filter layers to compensate for the effects of the different dielectric constants of the color filter layers on the electric field distribution, thereby enhancing the quality of images shown on the LCD 90.

Figure 8:
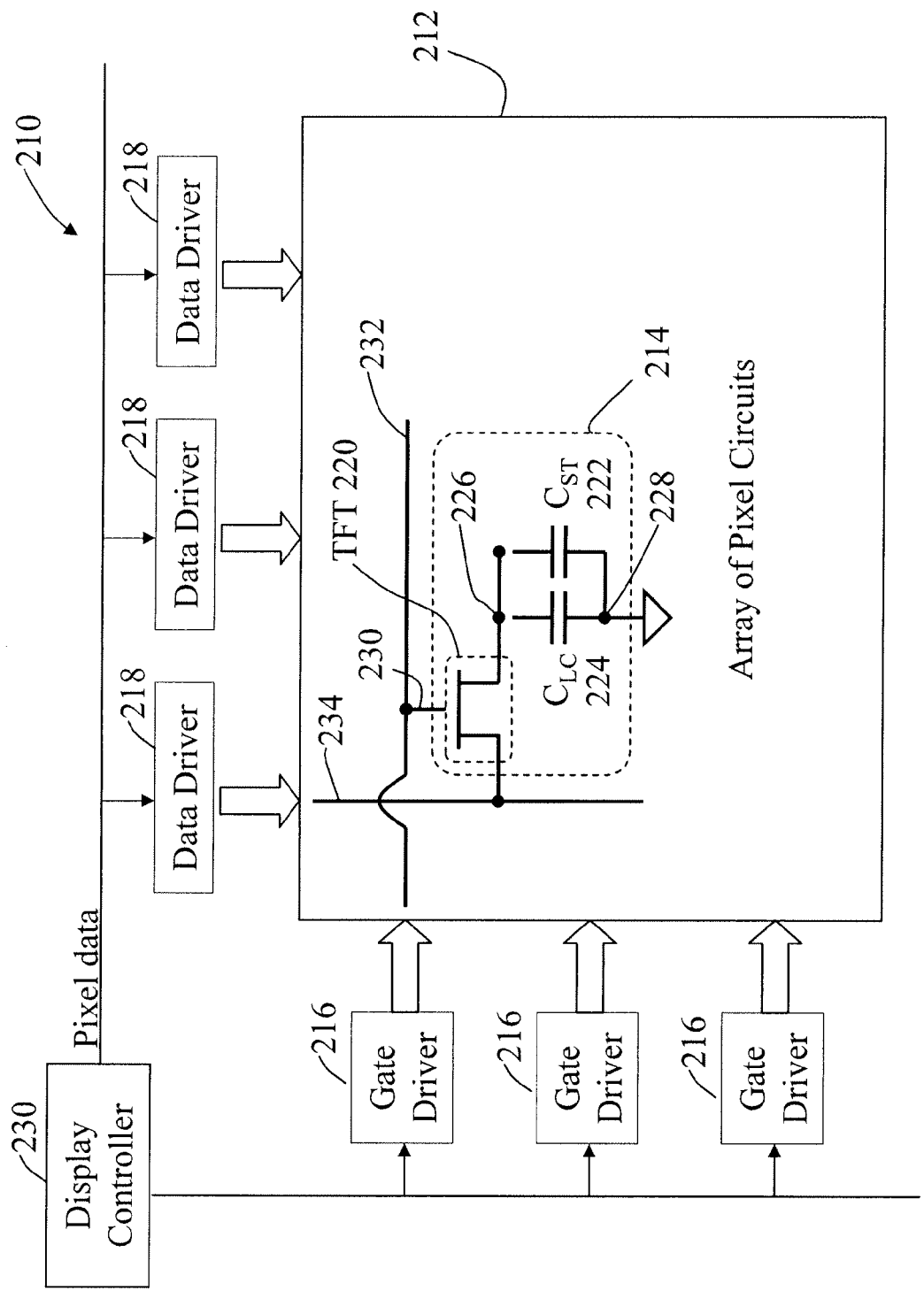
FIG. 8 is a schematic diagram of an example liquid crystal display panel.

FIG. 8 is a schematic diagram of an example liquid crystal display panel 210, which includes an array 212 of pixels 214 that are controlled by one or more gate drivers 216 and one or more data drivers 218. The gate drivers 216 and data drivers 218 are controlled by a display controller 230. Each pixel 214 includes one or more thin film transistors (TFT) 220, a storage capacitor $C_{ST}$ 222, and a liquid crystal cell that has an effective capacitance represented by a capacitor $C_{LC}$ 224. The storage capacitor $C_{ST}$ 222 can be formed by a pixel electrode (e.g., 121 in FIGS. 6A and 6B) and a common electrode (e.g., 116). The capacitors $C_{ST}$ 222 and $C_{LC}$ 224 can be, e.g., connected in parallel to a first node 226 and a second node 228. The TFT 220 includes a gate 230 that is connected to a gate line 232, which is connected to the gate driver 216. When the gate driver 216 drives the gate line 232 to turn on the TFT 220, the data driver 218 drives a data line 234 with a data voltage signal that is passed to the capacitors $C_{ST}$ 222 and $C_{LC}$ 224.

In some examples, the first node 226 is connected to the pixel electrode, and the second node 228 is connected to the common electrode. The voltage across the capacitor $C_{ST}$ 222 determines the voltage applied to the liquid crystal cell. The voltage on the data line 234 is sometimes referred to as a "pixel voltage" or "gray scale voltage" because it determines the gray scale level shown by the pixel 214.

The pixels 214 each includes a color filter layer (which can be red, green, or blue) to enable the pixel to show color. By varying the gray levels of the red, green, and blue pixels, a variety of colors can be produced. By using electrodes that have different patterns to compensate for the differences in dielectric constants of the color filter materials, high quality color images can be produced.

A number of embodiments of the invention have been described. Nevertheless, it will be understood that various modifications may be made without departing from the spirit and scope of the invention. Other implementations and applications are also within the scope of the following claims. For example, additional passivation layers, alignment layers, and compensation films can be used in the displays described above. The components of the displays, such as the liquid crystal layer, the color filters, and the electrodes can use materials and have parameters different from those described above.

The orientations of the liquid crystal molecules described above refer to the directions of directors of the liquid crystal molecules. The molecules may tend to point more in one direction (represented by the director) over time than other directions. For example, the phrase "the liquid crystal molecules are substantially aligned along a Z-axis direction" means that the average direction of the directors of the liquid crystal molecules are generally aligned along the Z-axis direction, but the individual molecules may point to different directions.

What is claimed is:

1. An apparatus comprising:
   a color filter substrate comprising:
   a transparent substrate having a first area and a second area;
   at least one first color filter formed on the first area;
   at least one second color filter formed on the second area, the second color filter having a dielectric constant that is smaller than the dielectric constant of the first color filter; and
   an electrode formed on the first area and the second area, the electrode defining at least one first slit in the first area and at least one second slit in the second area, the at least one first slit including a first slit having a width that is larger than the width of any of the second slits.

2. The apparatus of claim 1 in which the first color filter comprises a green resist material.

3. The apparatus of claim 1 in which the second color filter comprises at least one of a red resist material and a blue resist material.

4. The apparatus of claim 1 in which a difference between the dielectric constants of the first color filter and the second color filter is greater than 30% of the dielectric constant of the first color filter.

5. The apparatus of claim 1 in which the width of each of the first and second slits is between 6 μm and 12 μm.

6. The apparatus of claim 1 in which the first slit has a length greater than 80 μm.

7. The apparatus of claim 6 in which the at least one first slit includes a slit having a length that is less than 80 μm.

8. The apparatus of claim 1 in which the electrode comprises finger-like structures formed at a periphery of the first slit and a periphery of the second slit.

9. The apparatus of claim 1 in which a ratio between the width of the first slit to the width of the second slit is substantially equal to a ratio between the dielectric constant of the first color filter to the dielectric constant of the second color filter.

10. The apparatus of claim 1, further comprising an active component array substrate and a liquid crystal layer disposed between the color filter substrate and the active component array substrate.

11. The apparatus of claim 1, further comprising a backlight module and a liquid crystal display panel that comprises the color filter substrate.

12. An apparatus comprising: a display comprising:
   a first pixel having a first color filter and a first electrode, the first color filter having a first dielectric constant, the first electrode defining a first pattern having one or more openings; and
   a second pixel having a second color filter and a second electrode, the second color filter having a second dielectric constant that is different from the first dielectric constant, the second electrode defining a second pattern having one or more openings, in which the first pattern and the second pattern are different and configured to compensate for a difference in electric fields in the first and second pixels caused by a difference in the dielectric constants of the first and second color filters.

13. The apparatus of claim 12 in which the first pattern includes a short slit and a long slit, the second pattern also includes a short slit and a long slit, in which the long slit of the first pattern is wider than the long slit of the second pattern.

14. The apparatus of claim 12 in which the first electrode is electrically coupled to the second electrode.

15. The apparatus of claim 12 in which the first color filter comprises at least one of a red color filter, a green color filter, and a blue color filter.

16. An apparatus comprising:
   a display comprising:
   a first set of pixels each having a first color filter and a first electrode, the first color filters being of a same color and each having a first dielectric constant, the first electrodes having a same first pattern and each having one or more openings; and
   a second set of pixels each having a second color filter and a second electrode, the second color filters being of a same color and each having a second dielectric constant that is different from the first dielectric constant, the second electrodes having a same second pattern and each having one or more openings, in which the second pattern is different from the first pattern.

17. An apparatus comprising:
a color filter substrate, comprising:
  a transparent substrate defining a first area and a second area;
  at least one first color filter formed in the first area;
  at least one second color filter formed in the second area, the second color filter having a dielectric constant that is smaller than the dielectric constant of the first color filter; and
  an electrode formed in the first area and the second area, the electrode defining at least one first slit in the first area, the electrode including a plurality of first connecting portions that connect portions of the electrode layer at two sides of the first slit to form a plurality of first sub-slits,
  the electrode layer also defining at least one second slit in the second area, the electrode layer including a plurality of second connecting portions that connect portions of the electrode layer at two sides of the second slit to form a plurality of second sub-slits, in which the first sub-slits have an average length that is greater than the average length of the second sub-slits.

18. The apparatus of claim 17 in which the first color filter comprises a green resist material.

19. The apparatus of claim 17 in which the second color filter comprises at least one of a red resist material and a blue resist material.

20. The apparatus of claim 17 in which the electrode comprises a plurality of finger-like structures formed at a periphery of the first slit and a periphery of the second slit.

21. The apparatus of claim 17 in which each of the first sub-slits and the second sub-slits has a length that is greater than 20 μm.

22. The apparatus of claim 17 in which each of the first connecting portions and the second connecting portions has a width that is less than or equal to 6 μm.

23. The apparatus of claim 17 in which the number of the first connecting portions associated with each of the first slits is greater than the number of the second connecting portions associated with each of the second slits.

24. The apparatus of claim 17, further comprising an active component array substrate and a liquid crystal layer disposed between the color filter substrate and the active component array substrate.

25. The apparatus of claim 17, further comprising a backlight module and a liquid crystal display panel that comprises the color filter substrate.

26. A method comprising:
controlling pixels of a display to show an image; and
compensating differences in electric fields in different pixels having color filters with different dielectric constants by providing electrodes with different patterns for the different pixels, in which providing electrodes with different patterns comprises providing at least one of (a) different pixel electrodes having different patterns and (b) different common electrodes having different patterns.

27. The method of claim 26 in which providing electrodes with different patterns comprises providing a first electrode in a first pixel having a first color filter and a second electrode in a second pixel having a second color filter, the first electrode defining a first slit, the second electrode defining a second slit, the first slit having a width that is larger than the width of the second slit.

28. The method of claim 27 in which the first color filter comprises a green filter and the second color filter comprises a red filter.

29. The method of claim 26 in which providing electrodes with different patterns comprises providing a first electrode in a first pixel having a first color filter and a second electrode in a second pixel having a second color filter, the first electrode layer defining a first slit, the second electrode defining a second slit, the first electrode comprising first connecting portions that connect portions of the first electrode at two sides of the first slit to define a plurality of first sub-slits, and second electrode comprising second connecting portions that connect portions of the second electrode at two sides of the second slit to define a plurality of second sub-slits, the first sub-slits having an average length that is different from the average length of the second sub-slits.

* * * * *